United States Patent
Lehtinen et al.

(10) Patent No.: US 7,888,131 B2
(45) Date of Patent: Feb. 15, 2011

(54) PROCEDURE FOR ANALYSIS AND QUANTIFICATION OF A FLUID RESIDUAL PRODUCT IN A CLEANING PROCESS

(75) Inventors: Heikki Lehtinen, Hässelby (SE); Lars-Åke Henriksson, Sörberge (SE)

(73) Assignee: MVM Konsult AB, Timra (SE)

( * ) Notice: Subject to any disclaimer, the term of this patent is extended or adjusted under 35 U.S.C. 154(b) by 1022 days.

(21) Appl. No.: 10/480,385

(22) PCT Filed: Jun. 12, 2002

(86) PCT No.: PCT/SE02/01135

§ 371 (c)(1), (2), (4) Date: Dec. 11, 2003

(87) PCT Pub. No.: WO02/101335

PCT Pub. Date: Dec. 19, 2002

(65) Prior Publication Data

US 2004/0194807 A1    Oct. 7, 2004

(30) Foreign Application Priority Data

Jun. 13, 2001   (SE) .................................. 0102112

(51) Int. Cl.
   *G01N 1/00* (2006.01)
(52) U.S. Cl. .................. 436/174; 436/176; 436/179; 436/180

(58) Field of Classification Search .................. None
See application file for complete search history.

(56) References Cited

U.S. PATENT DOCUMENTS

| | | | |
|---|---|---|---|
| 4,138,313 A * | 2/1979 | Hillstrom et al. | 162/49 |
| 5,776,258 A * | 7/1998 | Olashuk et al. | 134/15 |
| 5,873,731 A | 2/1999 | Prendergast | |
| 5,913,984 A | 6/1999 | Löfdal | |

OTHER PUBLICATIONS

Patent Abstracts of Japan, of JP 2000-084566, Mar. 28, 2000 (Toto Ltd), entitled "Water Sterilizing and Purifying System".

* cited by examiner

*Primary Examiner*—Yelena G Gakh
(74) *Attorney, Agent, or Firm*—Dykema Gossett PLLC

(57) ABSTRACT

A procedure for analyzing a fluid residual product, consisting of a rinsing solution and product loss, from a process for cleaning objects that are part of a manufacturing process. The procedure is characterized in that it includes the steps of measuring the flow of residual product at repeated occasions at a physical location in the cleaning process, measuring a magnitude corresponding to the contents of product loss in the cleaning system at the same repeated occasions at the same location in the cleaning process, determining based on this information the amount of product loss that flows past during a time period ($T_0$–$t_1$), and reporting this information related to the final product or raw materials of the manufacturing process. The invention also concerns a system for the execution of the process.

5 Claims, 3 Drawing Sheets

US 7,888,131 B2

PROCEDURE FOR ANALYSIS AND QUANTIFICATION OF A FLUID RESIDUAL PRODUCT IN A CLEANING PROCESS

TECHNICAL AREA

The present invention concerns a procedure for analysing a fluid residual product in a cleaning process for objects that are part of a manufacturing process, and a device for executing the procedure.

INTRODUCTION

In current plants for the production of, for example, foodstuffs, different products are handled, transported and manufactured by the use of common equipment and devices. Unique equipment and devices are used in certain cases for the manufacture of a product. The common equipment and devices are cleaned on each occasion that exchange to another product occurs, and when there is the risk or suspicion that the equipment and devices do not satisfy hygienic standards, for example, in the event of the risk for or suspicion of the presence of undesired bacteria. Mechanised, often automatic, computer-controlled methods are currently used for the cleaning of equipment and devices in foodstuff plants, these methods being specially adapted for each production line. The cleaning takes place in a circuit without the equipment or devices needing to be disassembled. CIP (cleaning-in-place) is defined as a cleaning system with the circulation of rinsing and cleaning solutions through equipment and devices that are connected in a circuit. When a rinsing or cleaning solution flows past a surface that is to be cleaned, one of the processes that takes place is a mechanical processing of the surfaces, which is necessary for a satisfactory result. Different, specially adapted, cleaning programmes are required for different types of contaminants and for different equipment and devices in order for the cleaning result to be satisfactory.

The cleaning is controlled by time control (see Swedish patent document 510024) in the cleaning systems that are currently in use. Procedures and devices for quality control are currently mainly adapted for those products that the industry manufactures. Quality control of residual products during, for example, cleaning, comprises measurement of individual parameters and the weighing together of statistics over longer periods of time. One common method is also to collect the residual products that arise in a process in a vessel, after which the contents are analysed. The process can also be visually followed, that is, with the aid of the eye. Individual parameters that can be measured are, for example, concentration, temperature and electrical conductivity.

The aim of the invention is to determine for a piece of equipment or a device the amount of product that is lead to discharge or to another use than the intended use when undertaking the rinsing of the equipment or device with rinsing solution, normally water, before cleaning with a cleaning solution. The aim is also to present all parameters and calculations that are included with a high resolution (0.5-5 seconds) during the complete execution of the measurement in order to provide the process operator with reliable information, so that the amount of a residual product in a piece of equipment or a device that is led to discharge or taken for another use other than the intended use is minimized. The content of the information will be described hereinafter. The remaining product that is lead to discharge or taken for other use than the intended use is defined in this context as product loss. The product loss is specified as a weight or a volume of the residual product which through the rinsing process is lead to discharge or other use than the intended use. The fluid, product/water mixture that passes through the device will be denoted in this context as "residual product".

DESCRIPTION OF THE INVENTION

The invention comprises a procedure for analysing a fluid residual product, consisting of a rinsing solution and product loss, from a process for cleaning objects that are part of a manufacturing process. The procedure is characterised by the fact that it includes the following steps: measuring the flow of residual product at repeated occasions at a physical location in the cleaning process, measuring a magnitude corresponding to the contents of product loss in the cleaning system at the same repeated occasions at the same location in the cleaning process, determining based on this information the amount of product loss that flows past during a time period ($t_0$–$t_1$), and reporting this information related to the final product or raw materials of the manufacturing process. The invention also concerns a device for the execution of the procedure.

The invention is characterised in that the product loss in a cleaning process can be localised and its amount can be calculated using very simple operations. Relatively short intervals are required between the times of measurement and recording of the parameters related to product loss in order to localise the product loss in an efficient manner, in the normal case the interval length will be one (1) second. A volume calculation is carried out, based on the measurement data that has been recorded, that results in the desired information, such as the volume of raw material used or the volume of product produced.

The invention is also characterised by the following:

A distinction is made between "useful product loss" and product loss to the discharge (complete loss) specified in a unit that can be selected by the operator as described above.

The total water consumption during the cleaning process is displayed.

The water consumption for that part of the cleaning process during which no product is present in the cleaning system is displayed.

The water consumption for that part of the cleaning process during which product is present in the cleaning system is displayed.

The cleaning process is controlled according to its function.

DESCRIPTION OF FIGURES

The invention will be described in detail below by the description of an embodiment according to the attached drawings, where.

DESCRIPTION OF EMBODIMENTS

Embodiment 1.
Definitions

| | |
|---|---|
| Residual product | a water/product mixture in cleaning systems |
| Boundary product | the name given to residual products in dairies |

DESCRIPTION OF EMBODIMENTS

Embodiment 1.
Definitions

| | |
|---|---|
| Product loss | the "pure" residual product that is lost (denoted by "complete loss" in dairies) |
| Rinsing solution | the fluid medium, normally water, with which the residual product is transported through the cleaning system during rinsing, before cleaning with cleaning solution |

Figure 1:
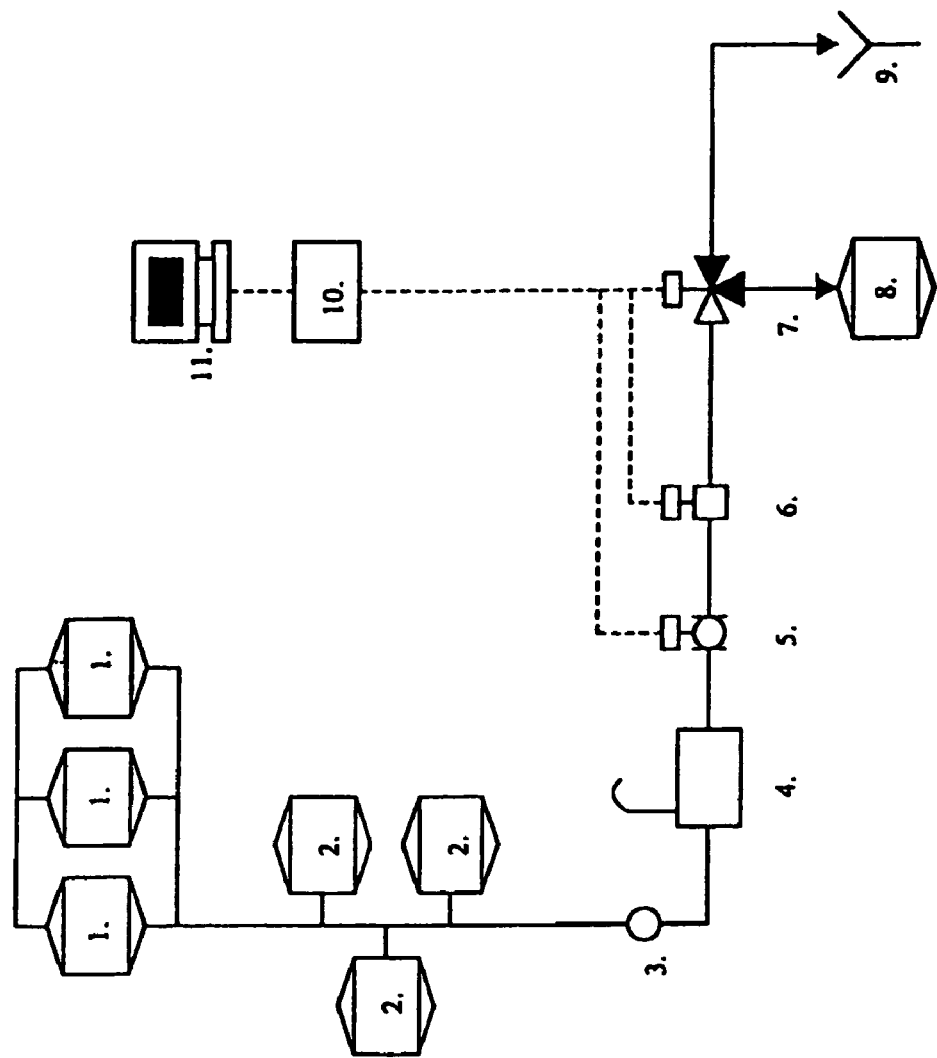
FIG. 1 shows schematically a cleaning system with a device according to the invention.

This example describes an application of the method within the dairy industry. The constituent parts of the invention when installed in a dairy are shown in FIG. 1. In a dairy, different products are handled, stored, transported and manufactured in different parts of the plant. Each piece of equipment, device, piece of apparatus, tank, etc., for the handling, storage, transport or manufacture of one product is part of an object 2 to be cleaned. Several objects to be cleaned are normally connected to one cleaning line 3. One dairy normally has 10-15 cleaning lines. Equipment for the method for which patent protection is sought is installed onto the relevant cleaning line 3 between the objects 2 to be cleaned and a boundary valve 7. The boundary valve 7 determines the destination to which the boundary product is to be led: to a discharge 9 or to a boundary product tank 8. The boundary product is normally used as animal fodder if it has a concentration that exceeds a pre-determined value. The boundary product that is led to the discharge 9 is normally treated at a municipal discharge treatment plant after the neutralisation of its pH in the neutralisation plant of the dairy.

During the measurement procedure, the boundary product is first led through a de-airer 4 (Trille™) in order to reduce the amount of air in the solution. This is necessary to ensure that the subsequent measurement is reliable. The boundary product then passes through a flow meter 5 and a concentration meter 6 of, for example, an infra-red type. The boundary product is then led through the boundary valve 7 for distribution as determined by the cleaning programme.

The calculation of product loss will now be described. See FIGS. 2-3.

Time Definitions:

$t_0$ the start time of the calculation
$t_1$ the end time of the calculation
$t_g$ the time at which the boundary valve opens or closes
t' the time that it takes for a column of fluid to pass from the flow meter 5 to the boundary valve 7
$t_g + t' = t'_g$ the calculated time for the opening or closing of the boundary valve, corrected for the distance between the flow meter 5 and the boundary valve 7
dt the time that elapses between each measured value.

The calculation of product loss is based on two parameters that are measured in the system: the flow Q and the concentration C. The value measured by the concentration meter (its output signal) is related to a concentration C of a known product, depending on the properties of the product. The graph of Q' against elapsed time dt shows the product volume that has passed through, which for each time point is calculated as the product of the flow Q and the concentration C of the known product. Thus, $Q' = C \times Q$.

The total product loss that passes the measurement system is equal to the area $V_{tot}$ that is formed under the graph of Q' between time $t_0$ and time $t_1$:

$$V_{tot} = \int_{t_0}^{t_1} Q' dt$$

The calculation above gives results for the complete chosen period between time $t_0$ and time $t_1$. Information about the destination of the product loss is also of interest, since one part of the product loss is taken for other use. In order to determine the different partial amounts and volumes, the volume V' of water that is enclosed between the sensor 6 and the boundary valve 7 is calculated. The instantaneous flow Q that is measured through the flow meter 5 is used together with the volume of water V' in order to calculate the time t'.

t' is calculated in two steps:

Step 1 is an iteration that is calculated by summing Q*dt for each measured value from time $t_g$ until the sum is equal to or greater than V'.

Step 2 checks how long it took to carry out the iteration in Step 1. t' is then given by the value determined in Step 2.

The boundary product that passes the boundary valve 7 when the latter is positioned in its first position (with gate 1 open) is equal to the area $V_1$ that is formed under the graph of Q' between the time $t_0$ and time $t'_g$:

$$V_1 = \int_{t_0}^{t'_g} Q' dt$$

The boundary product that passes the boundary valve 7 when the latter is positioned in its second position (with gate 2 open) is equal to the area $V_2$ that is formed under the graph of Q' between the time $t'_g$ and time $t_1$:

$$V_2 = \int_{t'_g}^{t_1} Q' dt$$

Figure 2:
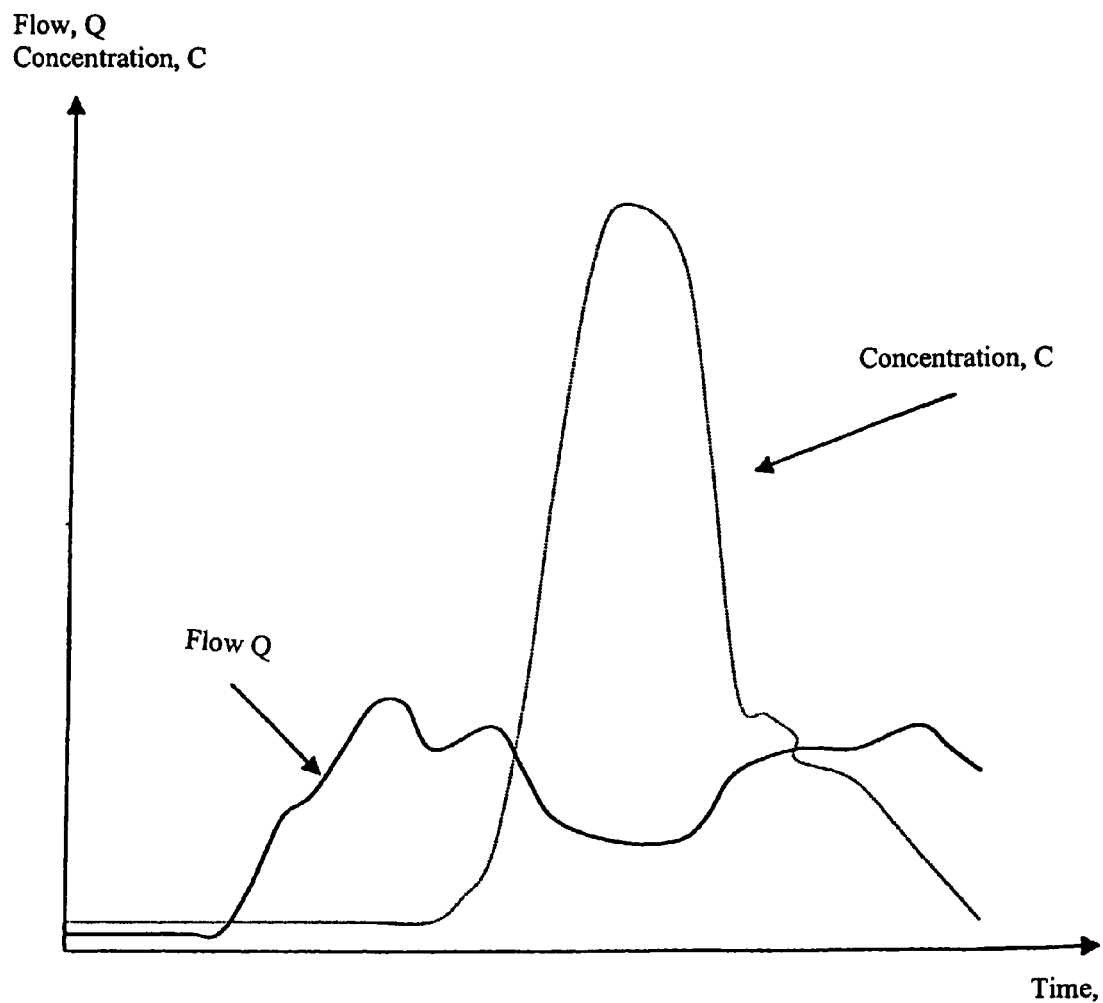
FIG. 2 shows a diagram of measured parameters that are used as the basis the calculation of product loss.
Figure 3:
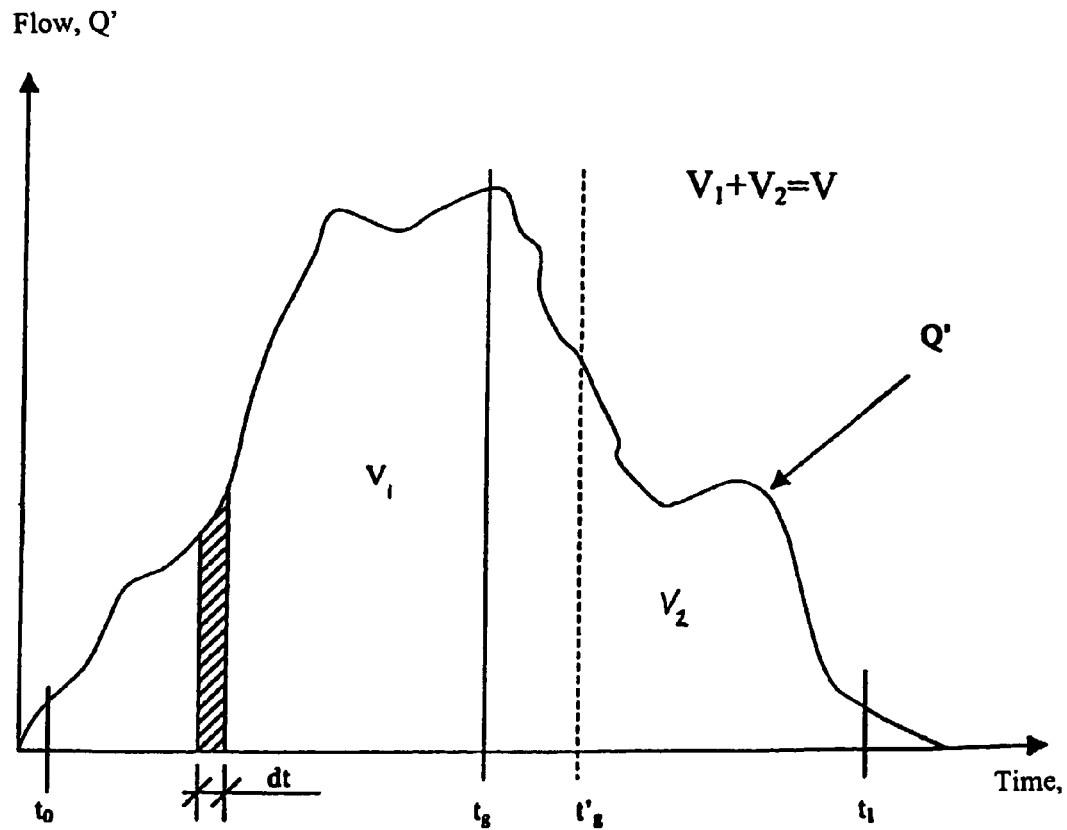
FIG. 3 shows a diagram of the calculated product loss.

The calculation of the water consumption in a cleaning process will be described below, see FIGS. 2 and 3.

Definitions (See Also Those Given Above):

$C_0$ the concentration of product that has been defined by the operator as the limit for clean water (water that does not contain product).

The calculation of water consumption and the classification of water quality are based on two parameters measured in the system: the flow Q and the concentration C. If the measured concentration C exceeds $C_0$ (see above), the water consumption Y is defined as water consumption or rinsing solution that contains product. If the measured concentration C lies under $C_0$ (see above), the water consumption X is defined as water consumption or rinsing solution that does not contain product. The total water consumption Z is the sum of rinsing solution that contains product Y and rinsing solution that does not contain product X. See Table 1.

The division of the pathway of the rinsing solution through the boundary valve is carried out in the same way as the calculation of boundary product described above. If the boundary valve 7 has its gate 1 open, the total water consumption between time $t_0$ and $t'g$, i.e. $X_1 + Y_1$, is recorded, see Table 1.

If the boundary valve 7 has its gate 2 open, the total water consumption between time $t'_g$ and $t_1$, i.e. $X_2+Y_2$, is recorded, see Table 1.

TABLE 1

| Rinsing solution (water) and product phases | Volume to boundary product tank (liter) | Volume to discharge (liter) | Total volume (liter) |
|---|---|---|---|
| Rinsing solution (water) without residual product | $X_1$ | $X_2$ | $X = X_1 + X_2$ |
| Rinsing solution (water) with residual product | $Y_1$ | $Y_2$ | $Y = Y_1 + Y_2$ |
| Total volume of rinsing solution (water), with and without residual product | $X_1 + Y_1$ | $X_2 + Y_2$ | $Z = X + Y$ |
| Product loss | $V_1$ | $V_2$ | $V = V_1 + V_2$ |

The Computer System is Used as Described Below:

Signals from the flow meter 5 and the concentration meter 6 together with a signal giving the position of the boundary valve 7 are logged (received) by a PLC (programmable logical computer) 10. Several cleaning lines can be simultaneously connected to the PLC 10, as can other types of sensor giving pH, temperature, conductivity, etc. The PLC 10 has been programmed such that the calculations are made taking into consideration the distance between the measurement points (the locations of the sensors 5 and 6) and the location of the boundary valve 7. The subsequent calculations will be, in this way, correct (see above). The measurements logged by the PLC 10 and the calculations are transferred to a PC 11 for storage, processing and presentation of the data.

The PC 11 displays information on, for example, a monitor. The display of information uses curves showing trends for the selected information and the selected time interval, or showing online values. The user can, furthermore, choose to calculate key information for a specified time interval. In order for this to be possible, it is necessary that the user specifies the product type (for example, low-fat milk), the time interval, the name of the calculation, the number of the cleaning line, etc. A calculation can be started once this information has been given.

The PC 11 presents the results as shown in Table 1.

The PC 11 stores, calculates and communicates sets of data. The interface for communication with other computer systems (such as control systems or operations systems) is connected to the PC 11. The purpose of this communication is that the PC 11 should continuously provide information to the computer system connected to it based on pre-selected criteria in the form of boundary values, time intervals, etc., and based on events that occur in real time in the connected computer system. The user can exploit the information in his or her own computer system for control and guidance of the process under consideration.

Examples of Interfaces:
Data from a connected computer system to the PC 11:
  start times for cleaning of objects and the objects that are to be cleaned.
  valve positions for selected valves.

Data from the PC 11 to the connected computer system:
  the information given in Table 1 above.
  variables set in the PC 11.
  other configuration of information that is handled by the PC 11.

Embodiment 2

Connection of measuring equipment for other foodstuffs industries or other process industries that use cleaning processes is carried out in the same way as that described above. De-airing by the de-airer 4 can be omitted if the presence of air does not introduce problems for the measurement. The concentration meter 6 is replaced as required by other sensors that can report the amount of the relevant product in the boundary product. The boundary valve 7 can be omitted if the boundary product is not led to other units after the cleaning process.

The invention claimed is:

1. A method for analyzing a fluid residual product in a cleaning system, the fluid residual product consisting of a rinsing or a cleaning solution and a product removed from equipment used in a manufacturing system for the product, with additional steps of determining the amount of said fluid residual product being delivered to one of at least two destinations, comprising the steps of
   (a) deaerating a flow of said fluid residual product,
   (b) thereafter continuously measuring a full flow (Q) of fluid residual product per short time unit (dt) at a predetermined location in the cleaning system,
   (c) continuously measuring per the same short time unit (dt) a magnitude (C) corresponding to the content(s) of product in the fluid residual product at said predetermined location in the cleaning system,
   (d) determining, based on said measurements, an amount of product (Q') that flows through said predetermined location per the same short time unit (dt), where Q'=C*Q,
   (e) calculating the total amount ($V_{tot}$) of product that flows through said predetermined location by integration of the expression Q'dt for a selected time period ($t_0$–$t_1$),
   (f) reporting said amount ($V_{tot}$) of product as product loss from the manufacturing system during a selected time period ($t_0$–$t_1$),
   (g) calculating the volume (V') of a piece of conduit between a flow meter and a boundary valve,
   (h) calculating time (t') for the fluid residual product to flow from the flow meter to the boundary valve by the use of an iterative calculation starting at the time ($t_g$) when said boundary valve closes/opens, and by the use of product of the flow rate (Q) and corresponding short time interval (dt), i.e., the formula Q*dt unit this product is equal to or greater than V',
   (i) calculating the time ($t'_g$) when the boundary valve closes/opens adjusted for the distance between the flow meter and the boundary valve,
   (j) calculating the time periods for delivery ($t_0$–$t_g$ and $t_g$–$t_1$) to the respective destinations,
   (k) determining the partial amount of the fluid residual product to each of said respective destinations, and
   (l) reporting said partial amount of fluid residual product to each of said respective destinations.

2. The method according to claim 1, comprising the additional steps of determining the amount of said fluid residual product being delivered to one of at least two destinations by (g) calculating the volume (V') of the piece of conduit between the concentration (magnitude) meter and the boundary valve, (h) calculating time (t') for the fluid residual product to flow from the flow meter to the boundary valve by the use of an iterative calculation starting at the time ($t_g$) when said boundary valve closes/opens, and by the use of product of the flow rate (Q) and corresponding short time interval (dt), i.e., the formula Q* dt until this product is equal to or greater than V', (i) calculating the time ($t'_g$) when the boundary valve closes/opens adjusted for the distance between the flow meter and the boundary valve, (j) calculating the time periods for delivery ($t_0-t'_g$ and $t'_g-t_1$) to the respective destinations, (k) determining the partial amount of the fluid residual product to each of said respective destinations, and (l) reporting said partial amount of fluid residual product to each of said respective destinations.

3. The method according to claim 1, comprising the additional steps of calculating the amount of fluid residual product without content of the manufactured product (pure rinsing or cleaning solution) and the amount of the fluid residual product that contains the manufactured product, based on continuously measuring of the full flow (Q) of fluid residual product per short time unit (dt) at a predetermined location in the cleaning system, continuously measuring per the same short time unit (dt) a magnitude (C), corresponding to the content(s) of the product in the fluid residual product at said predetermined location in the cleaning system, the predetermined magnitude value $C_0$ that defines the pure rinsing solution, i.e., fluid residual product without content of the manufactured product, determining, based on said measurements and predetermined magnitude value $C_0$, the amount of fluid residual product containing and not containing the manufactured product respectively, during the time periods for delivery ($t_0-t'_g$ or $t'_g-t_1$), to the respective destinations, and reporting said amount of fluid residual product containing and not containing the manufactured product respectively, during the time periods for delivery ($t_0-t'_g$ or $t'_g-t_1$) to the respective destinations.

4. The method according to claim 3, comprising the additional step of providing information, based on pre-selected criteria and pre-set values in a computer system, for control and guidance of said manufacturing system.

5. In a manufacturing system for making a final product from raw materials and which includes a plurality of treatment apparatus and a cleaning system for rinsing and cleaning at least one of said treatment apparatus, the method of analyzing a fluid residual product consisting of rinsing or cleaning solution and product from the manufacturing system in the cleaning system, with additional steps of determining the amount of said fluid residual product being delivered to one of at least two destinations, which comprises the steps of:

(a) de-aerating a flow of the fluid residual product, (b) after step (a) continuously measuring a full flow (Q) of fluid residual product per short time unit (dt) at a predetermined location in the cleaning system, (c) continuously measuring per the same short time unit (dt) a magnitude (C) corresponding to the content(s) of product in the fluid residual product at said predetermined location in the cleaning system, (d) determining from the measurements of steps (b) and (c), the contents(s) of product (Q') that flows through said predetermined location per the same short time unit (dt), where Q'=C*Q, (e) calculating the total amount (Vtot) of product that flows through said predetermined location by integration of the expression Q'dt over the time period ($t_0-t_1$), (f) reporting the calculated total amount of product loss during said time period ($t_0-t_1$), (g) calculating the volume (V') of a piece of conduit between a flow meter and a boundary valve, (h) calculating time (t') for the fluid residual product to flow from the flow meter to the boundary valve by the use of an iterative calculation starting at the time ($t_g$) when said boundary valve closes/opens, and by the use of product of the flow rate (Q) and corresponding short time interval (dt), i.e., the formula Q*dt until this product is equal to or greater than V', (i) calculating the time ($t'_g$) when the boundary valve closes/opens adjusted for the distance between the flow meter and the boundary valve, (j) calculating the time periods for delivery ($t_0-t_g$ and $t_g-t_1$) to the respective destinations, (k) determining the partial amount of the fluid residual product to each of said respective destinations, and (l) reporting said partial amount of fluid residual product to each of said respective destinations.

* * * * *